(12) United States Patent
Swaminathan et al.

(10) Patent No.: US 9,934,264 B2
(45) Date of Patent: Apr. 3, 2018

(54) TECHNIQUE FOR REDUCING METADATA STORED IN A MEMORY OF A NODE

(71) Applicant: NetApp, Inc., Sunnyvale, CA (US)

(72) Inventors: Manish Swaminathan, Fremont, CA (US); Dhaval Patel, Sunnyvale, CA (US); Edward D. McClanahan, Danville, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 457 days.

(21) Appl. No.: 14/728,482

(22) Filed: Jun. 2, 2015

(65) Prior Publication Data
US 2016/0357743 A1 Dec. 8, 2016

(51) Int. Cl.
*G06F 7/00* (2006.01)
*G06F 17/30* (2006.01)
*G06F 12/02* (2006.01)

(52) U.S. Cl.
CPC ...... *G06F 17/3033* (2013.01); *G06F 12/0246* (2013.01); *G06F 12/0261* (2013.01); *G06F 17/30194* (2013.01); *G06F 17/30914* (2013.01)

(58) Field of Classification Search
None
See application file for complete search history.

(56) References Cited

U.S. PATENT DOCUMENTS

| | | |
|---|---|---|
| 8,880,787 B1 | 11/2014 | Kimmel et al. |
| 8,996,535 B1 | 3/2015 | Kimmel et al. |
| 2012/0047115 A1* | 2/2012 | Subramanya ..... G06F 17/30138 707/696 |

* cited by examiner

*Primary Examiner* — Uyen Le
(74) *Attorney, Agent, or Firm* — Cesari and McKenna, LLP

(57) ABSTRACT

A technique reduces an amount of metadata stored in a memory of a node in a cluster. An extent store layer of a storage input/output (I/O) stack executing on the node stores key-value pairs in a plurality of data structures, e.g., cuckoo hash tables, resident in the memory. The cuckoo hash table embodies metadata that describes an extent and, as such, may be organized to associate a location on disk with a value that identifies the location on disk. The value may be embodied as a locator that includes a reference count used to support deduplication functionality of the extent store layer with respect to the extent. The reference count is divided into two portions: a delta count portion stored in memory for each slot of the hash table and an overflow count portion stored on disk in a header of each extent. One bit of the delta count portion is reserved as an overflow bit that indicates whether the in-memory reference count has overflowed. Another bit of the delta count portion is reserved as a sign bit that indicates whether the value of the remaining delta count portion, which stores the "delta" of the reference count, is positive or negative. Overflow updates to the overflow count portion on disk are postponed until all of the bits of the delta count portion are consumed as negative/positive transitions.

20 Claims, 10 Drawing Sheets

TECHNIQUE FOR REDUCING METADATA STORED IN A MEMORY OF A NODE

BACKGROUND

Technical Field

The present disclosure is related to storage systems and, more specifically, to reduction of metadata stored in a memory of a storage system.

Background Information

A storage system typically includes one or more storage devices, such as disks embodied as hard disk drives (HDDs) or solid state drives (SSDs), into which information may be entered, and from which information may be obtained, as desired. The storage system may implement a high-level module, such as a file system, to logically organize the information stored on the disks as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the disks for the data.

In a traditional file system, large amounts of metadata updates (changes) may be incurred when processing input/output (I/O) requests, such as read or write requests. That is, a relatively large amount of metadata may be necessary to process the I/O requests and, thus, a substantial amount of memory, e.g., RAM, of the storage system may be consumed by the necessary metadata, which may be better (i.e., more efficiently) used. Thus, there is a need to reduce an in-core (i.e., memory) footprint of the necessary metadata for processing I/O requests.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
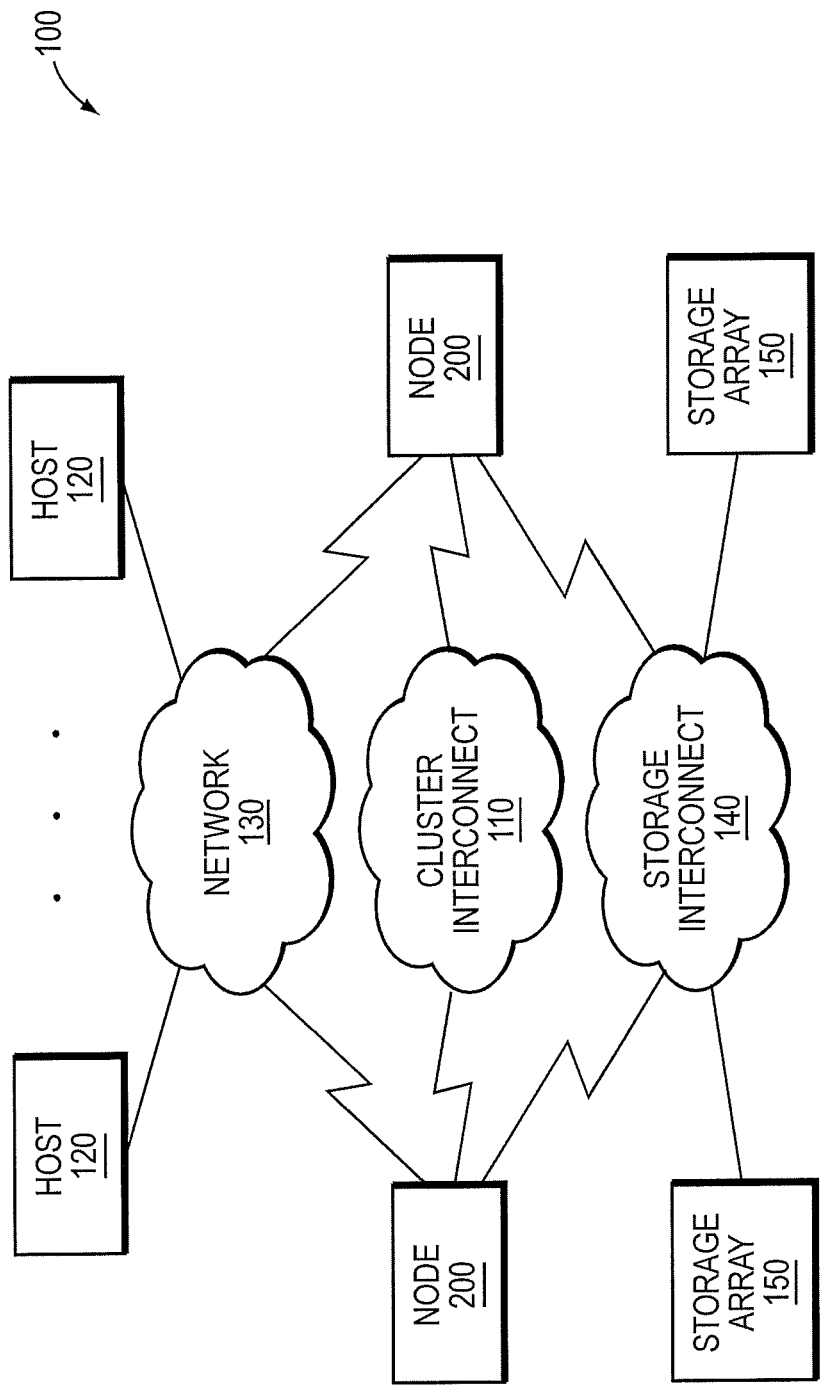
FIG. 1 is a block diagram of a plurality of nodes interconnected as a cluster.

The embodiments described herein are directed to a technique for reducing an amount of metadata stored in a memory of a node in a cluster. An extent store layer of a storage input/output (I/O) stack executing on the node stores key-value pairs (i.e., key-value store) in a plurality of data structures, e.g., cuckoo hash tables, resident in the memory. A portion of each key may be used to index a hash table, wherein each slot of the hash table contains a remainder portion of the respective key (i.e., key of the key-value pair) along with a value (i.e., value of the key-value pair) configured to reference a location of an extent on one or more storage devices, such as disks embodied as solid state drives (SSDs). That is, the cuckoo hash table (i.e., key-value store) embodies metadata that describes the extent and, as such, may be organized to associate a location on SSD with a value identifying that location. Illustratively, the value may be embodied as a locator that includes attributes (e.g., location and size) of the extent stored on disk. The attributes of the locator may include an offset and a length of the extent on disk, as well as a reference count for the extent. The reference count is illustratively used to support deduplication functionality of the extent store layer with respect to the extent. For example, multiple put operations having identical data patterns may be de-duplicated to a same extent. The reference count for the extent may then be incremented to reflect the multiple deduplications for that extent.

According to the technique, the reference count has a predetermined length (e.g., 5-bytes) that is illustratively divided into two predetermined portions: a 2-byte delta count portion stored in memory for each slot of the hash table and a 3-byte overflow count portion stored on disk in a header of each extent (i.e., the extent header). In an embodiment, one bit of the 2-byte (16-bit) delta count portion is reserved as an overflow bit that indicates whether the in-memory reference count has overflowed. Another bit of the delta count portion is reserved as a sign bit that indicates whether the value of the remaining delta count portion, which stores a "delta" (i.e., an amount of difference) of the reference count, is positive or negative, i.e., a signed magnitude integer representation for the delta of the reference count. In response to each deduplication of the extent, the delta count portion of the reference count increments up to a total count representative of 14 bits (e.g., a maximum value of 16,383). Upon a next deduplication and reference count increment, the overflow count portion (on disk) increments to indicate a number of times the in-memory delta count portion of the reference count overflows. Therefore, overflow updates to the overflow count portion on disk are postponed until all of the bits of the delta count portion are consumed as negative/positive transitions.

In an embodiment, capacity statistics may be computed at the extent store layer, wherein the statistics include deduplication savings. According to the technique, the capacity statistics are computed and maintained on a per hash table basis, so that fuzzy checkpointing and logging mechanisms for the hash tables may be employed to store the capacity statistics. When the reference count overflows for the extent and an overflow update occurs, the total overflow reference (i.e., de-duplicated) bytes are updated and maintained for all entries (extents) of each hash table. Illustratively, the total overflow reference bytes are stored in an index header of each hash table page that is eventually checkpointed to disk and logged to non-volatile random access memory for crash recovery purposes. In response to a mount after a clean (or dirty) shutdown, the hash table pages are read to obtain the total overflow bytes from the index headers and the delta bytes are obtained from the delta count portions stored in the hash table slots. The total overflow bytes and the delta bytes may then be used to compute the capacity (de-duplicated) statistics.

Advantageously, the technique described herein provides a substantial reduction in memory consumption (i.e., substantial space savings) across the all of the hash tables by reducing an otherwise in-memory reference count attribute, illustratively, from 5 bytes to 2 bytes (i.e., the delta count portion), resulting in a memory space savings of 3 bytes for each slot of each hash table. Note that a larger sized otherwise in-memory reference count attribute, such as 7 bytes, may also be reduced to 2 bytes, resulting in greater space savings (e.g., 5 bytes). In addition, the technique reduces write amplification by postponing overflow updates to the overflow count portion on disk until all of the bits of the delta count portion are consumed as negative/positive transitions. Moreover, by storing the total overflow reference bytes in an index page header of each hash table, the technique enables efficient computation of capacity statistics.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
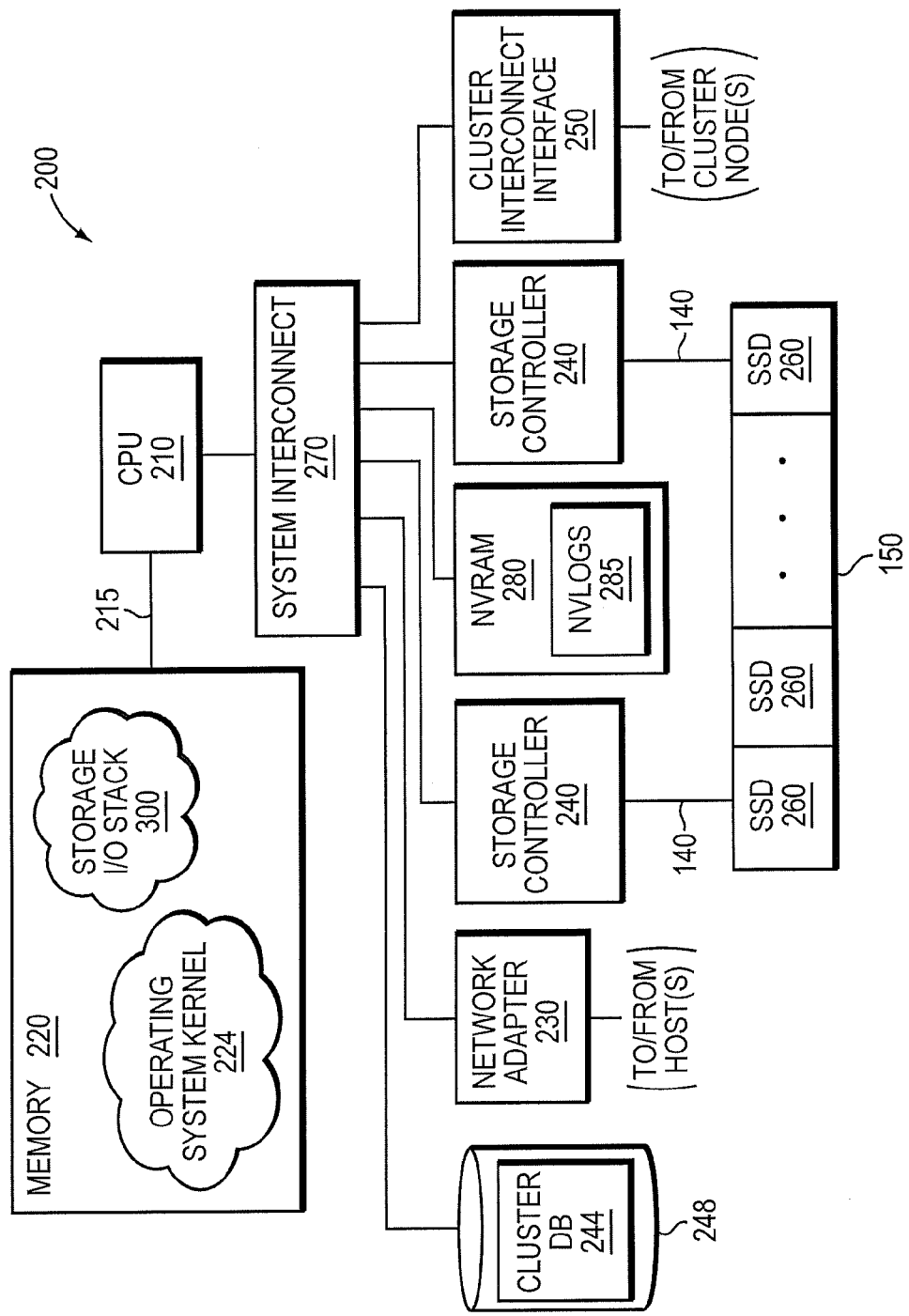
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory, such as storage class memory) that is capable of maintaining data in light of a failure to the node and cluster environment. Illustratively, a portion of the NVRAM 280 may be configured as one or more non-volatile log (NVLogs 285) configured to temporarily record ("log") I/O requests, such as write requests, received from the host 120.

Storage I/O Stack

Figure 3:
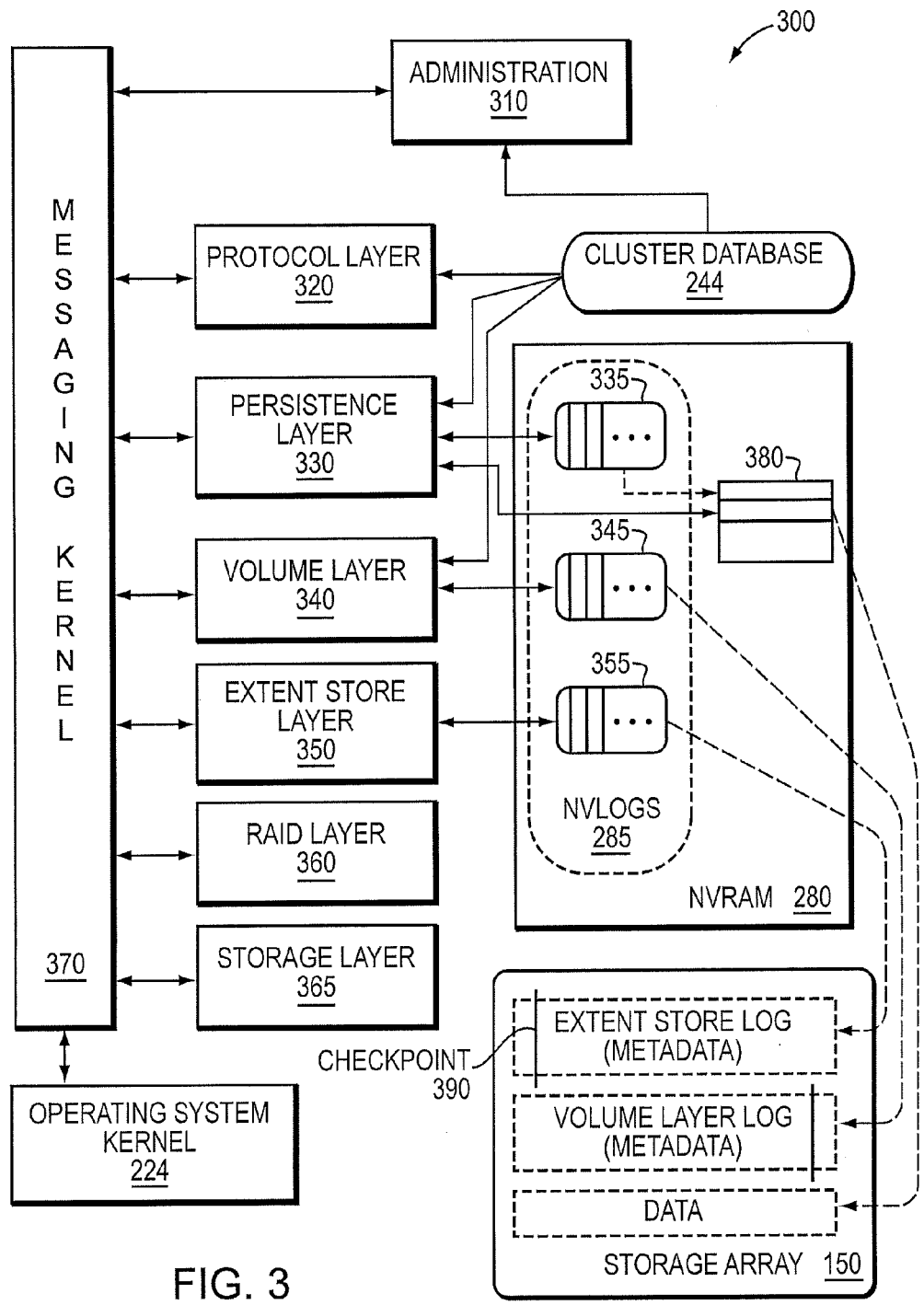
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) storage layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment, only I/O requests that modify the LUN (e.g., write requests) are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. As described further herein, an extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been checkpointed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
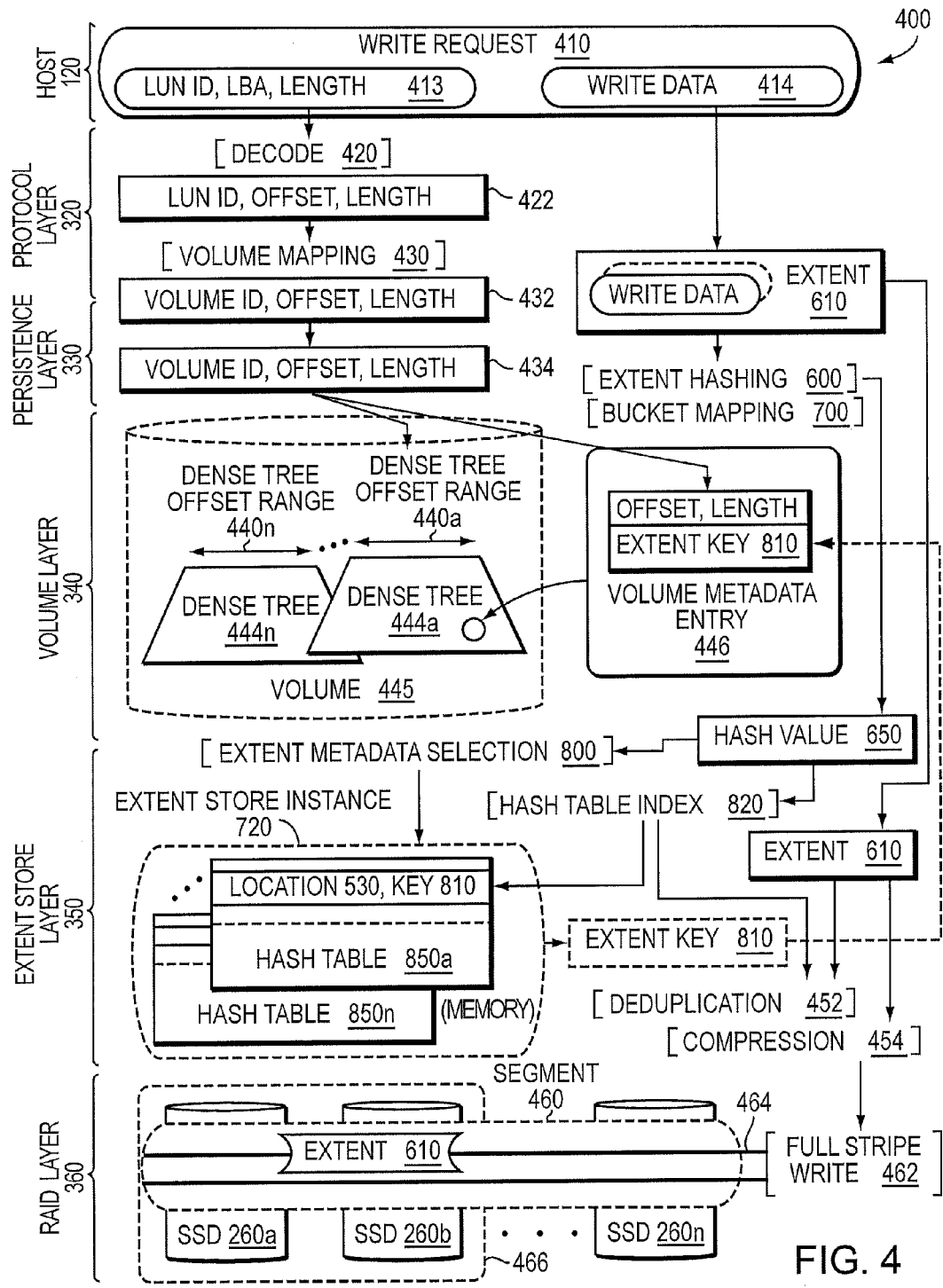
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 610 and perform a hash computation, i.e., a hash function, on the new extent to generate a hash value 650 in accordance with an extent hashing technique 600.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to anther node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 700 is provided that translates the hash value 650 to an instance 720 of an appropriate extent store layer (i.e., extent store instance 720) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 700 described herein. The persistence layer 330 may then pass the hash value 650 and the new extent 610 to the appropriate volume layer instance and onto the appropriate extent store instance via an extent store put operation. The extent hashing technique 600 may embody an approximately uniform hash function to ensure that any random extent to be written may have an approximately equal chance of falling into any extent store instance 720, i.e., hash buckets are distributed across extent store instances of the cluster 100 based on available resources. As a result, the bucket mapping technique 700 provides load-balancing of write operations (and, by symmetry, read operations) across nodes 200 of the cluster, while also leveling flash wear in the SSDs 260 of the cluster.

In response to the put operation, the extent store instance may process the hash value 650 to perform an extent metadata selection technique 800 that (i) selects an appropriate hash table 850 (e.g., hash table 850a) from a set of hash tables (illustratively in-core) within the extent store instance 720, and (ii) extracts a hash table index 820 from the hash value 650 to index into the selected hash table and lookup a table entry having an extent key 810 identifying a storage location 530 on SSD 260 for the extent. Accordingly, the extent store layer may contain computer executable instructions executed by the CPU 210 to perform operations that implement the extent metadata selection technique 800. If a table entry with a matching key is found, then the SSD location 530 mapped from the extent key 810 is used to retrieve an existing extent (not shown) from SSD. The existing extent is then compared with the new extent 610 to determine whether their data are identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 810 of the existing extent is passed to the appropriate volume layer instance for storage within an entry (denoted as volume metadata entry 446) of a dense tree metadata structure 444 (e.g., dense tree 444a), such that the extent key 810 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys mapping to the same bucket as needed to either provide de-duplication 452 or to produce an extent key that is not already stored within the extent store instance. Notably, another hash table (e.g. hash table 850n) may be selected by a new candidate extent key in accordance with the extent metadata selection technique 800. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 610. Illustratively, the identified storage segment is a segment with a large contiguous free space having, e.g., location 530 on SSD 260b for storing the extent 610.

In an embodiment, the RAID layer 360 then writes the stripes 464 across the RAID group 466, illustratively as one or more full stripe writes 462. The RAID layer 360 may write a series of stripes 464 of sufficient depth to reduce data relocation that may occur within flash-based SSDs 260 (i.e., flash block management). The extent store instance then (i) loads the SSD location 530 of the new extent 610 into the selected hash table 850n (i.e., as selected by the new candidate extent key), (ii) passes a new extent key (denoted as extent key 810) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer 345. Accordingly, the I/O (write) request is sufficiently stored on SSD 260 of the cluster.

Read Path

Figure 5:
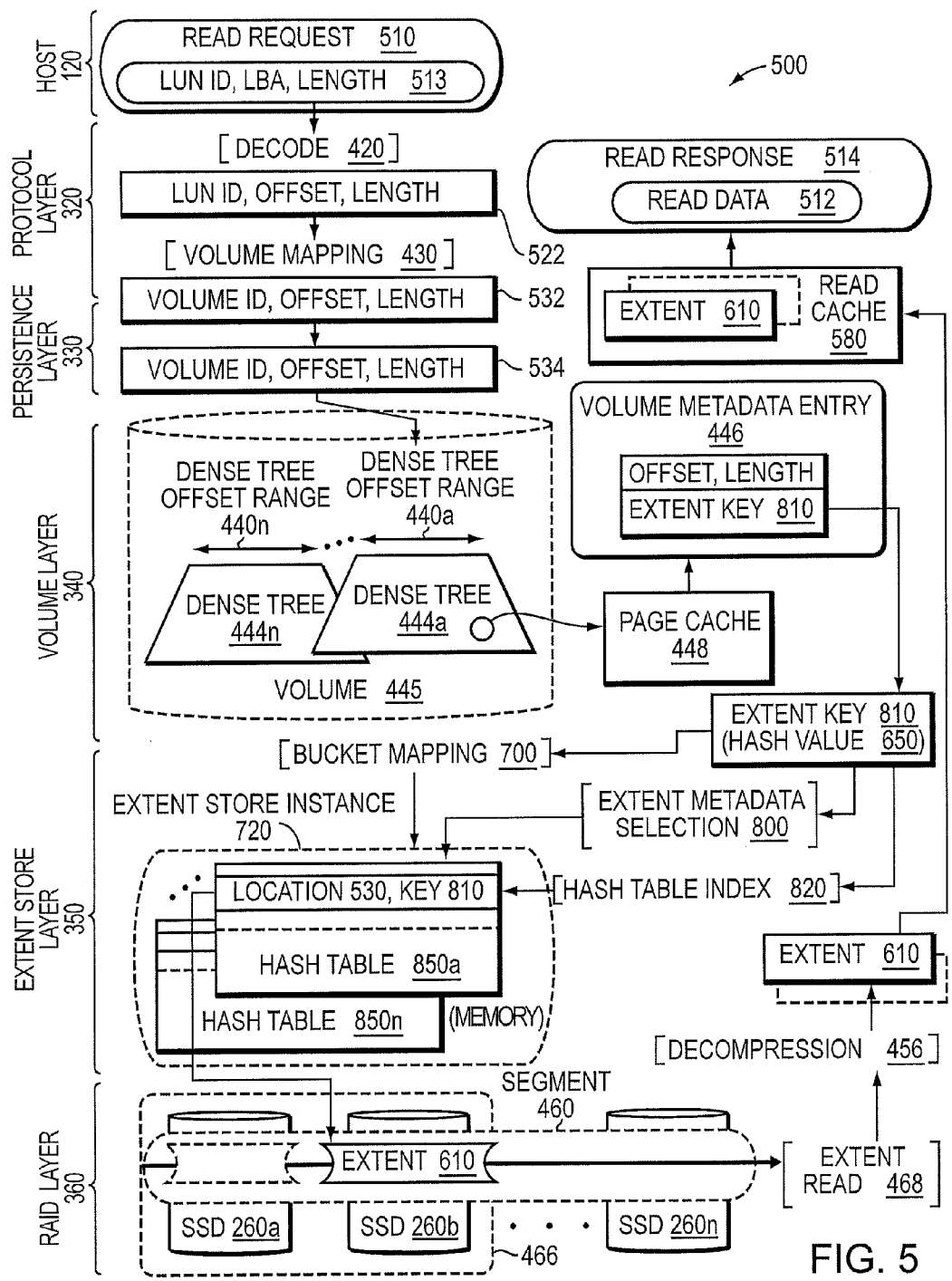
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., for RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 810 associated with one or more extents 610 within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 810 for the entire requested read range are found. If no metadata entries exist for the entire or portions of the requested read range, then the missing portion(s) are zero filled.

Once found, each extent key 810 is processed by the volume layer 340 to, e.g., implement the bucket mapping technique 700 that translates the extent key to an appropriate extent store instance 720 responsible for storing the requested extent 610. Note that, in an embodiment, each extent key 810 may be substantially identical to the hash value 650 associated with the extent 610, i.e., the hash value as calculated during the write request for the extent, such that the bucket mapping 700 and extent metadata selection 800 techniques may be used for both write and read path operations. Note also that the extent key 810 may be derived from the hash value 650. The volume layer 340 may then pass the extent key 810 (i.e., the hash value from a previous write request for the extent) to the appropriate extent store instance 720 (via an extent store get operation), which performs an extent key-to-SSD mapping to determine the location on SSD 260 for the extent.

In response to the get operation, the extent store instance may process the extent key 810 (i.e., hash value 650) to perform the extent metadata selection technique 800 that (i) selects an appropriate hash table 850 (e.g., hash table 850a) from a set of hash tables within the extent store instance 720, and (ii) extracts a hash table index 820 from the extent key 810 (i.e., hash value 650) to index into the selected hash table and lookup a table entry having a matching extent key 810 that identifies a storage location 530 on SSD 260 for the extent 610. That is, the SSD location 530 mapped to the extent key 810 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Extent Hash Structure

Figure 6:
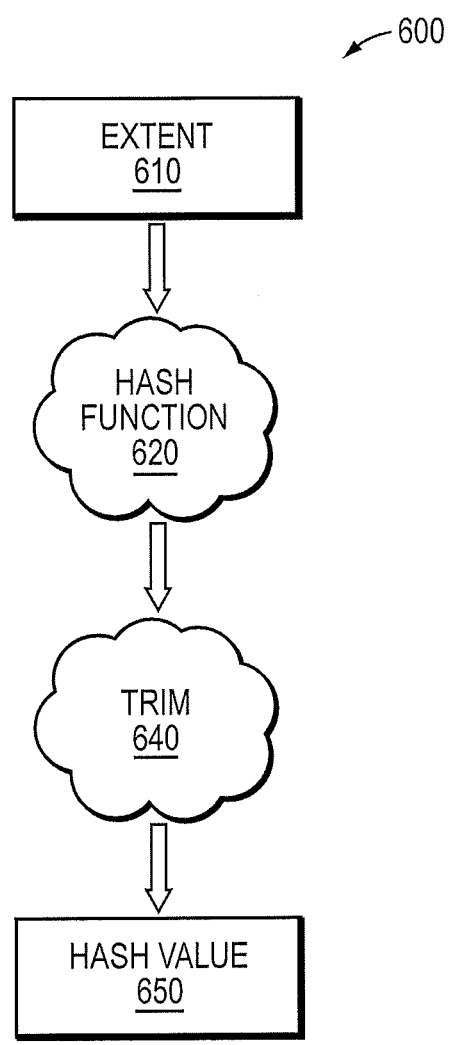
FIG. 6 is a block diagram of an extent hashing technique.

FIG. 6 is a block diagram of the extent hashing technique 600 that may be advantageously used with one or more embodiments described herein. As noted, the persistence layer 330 may organize the write data of one or more write requests into one or more extents 610, each of which is embodied as a variable length block. The length of the extent may vary between 1 byte and 64 KB (or larger) although, e.g., the extent is typically 4 KB or more in length. The extent 610 is illustratively a logically contiguous portion of a LUN (or file) that is stored physically contiguous on SSD 260 within a node of the cluster so that, e.g., it can be read from the SSD in a single read operation. Thus, extents aggregated from multiple I/O requests may include contiguous offset ranges within any LUN. Accordingly, multiple LUNs (and/or files) may share the same extent at different addresses (so long as logically contiguous within each LUN), because the extent generally does not maintain information with respect to its presence in the storage pool of the cluster 100. As a result, two or more volume metadata entries may include a same extent key.

In an embodiment, a random technique, such as a hash function 620 (e.g., an approximately uniform hash), may be applied to each extent 610 to generate a hash value 650 that is used to distribute (e.g., using the extent metadata selection technique) the write data (i.e., extent data) and associated metadata substantially evenly among the nodes 200 to enable fine-grain scale out and de-duplication 452 in the cluster 100. The hash computation is performed on the entire extent and may be computed any time before the extent is passed to an extent store instance. Illustratively, the resulting hash value 650 may be used for two generally similar tasks. The first task is to distribute (spread) the extents and associated metadata evenly within each extent store instances. Thus, the hash value 650 is illustratively computed at the persistence layer 330, but may be computed at or before the volume layer 340 because the volume layer needs the hash value to determine the extent store instance of a node that services the extent.

The hash computation is illustratively performed in accordance with a secure hash algorithm, e.g., SHA-3 or Echo 256 cryptographic hash function, to generate a 256-bit hash function result (not shown). Alternatively, hash algorithms, such as SipHash (secure 64-bit) or CityHash (non-crypto 64-bit) may be used. A portion, e.g., the lower 6 bytes (48 bits), of the 256-bit hash function result may be illustratively trimmed, e.g., in accordance with a trim technique 640, to generate a 48-bit hash value 650. It will be apparent to those skilled in the art that the trimmed size of the hash value may be enlarged as the storage capacity of the cluster increases. In an embodiment, the trim technique 640 essentially truncates or severs the 6-byte (48-bit) portion of the hash value 650 from the 32-byte hash function result. The resulting 6 bytes (48 bits) of the hash value 650 are illustratively sufficient to enable the extent store instance to find a representation of the location of the extent 610 on SSD 260 via entries in the hash tables 850. In addition, the hash value 650 illustratively enables its associated metadata, e.g., extent metadata in entries of the hash tables 850, to reside entirely in memory 220. However, a wider hash value (i.e., consuming more memory 220) may be used to improve the chances of performing de-duplication 452 of new extents without having to actually compare the write data of previous extents stored on SSD. The hash value 650 may be used to perform address-like determinations within portions of its hash space in accordance with various techniques, such as bucket mapping 700 and extent metadata selection 800 within the storage I/O stack 300, to select the appropriate hash table 850a for the extent 610.

Figure 7:
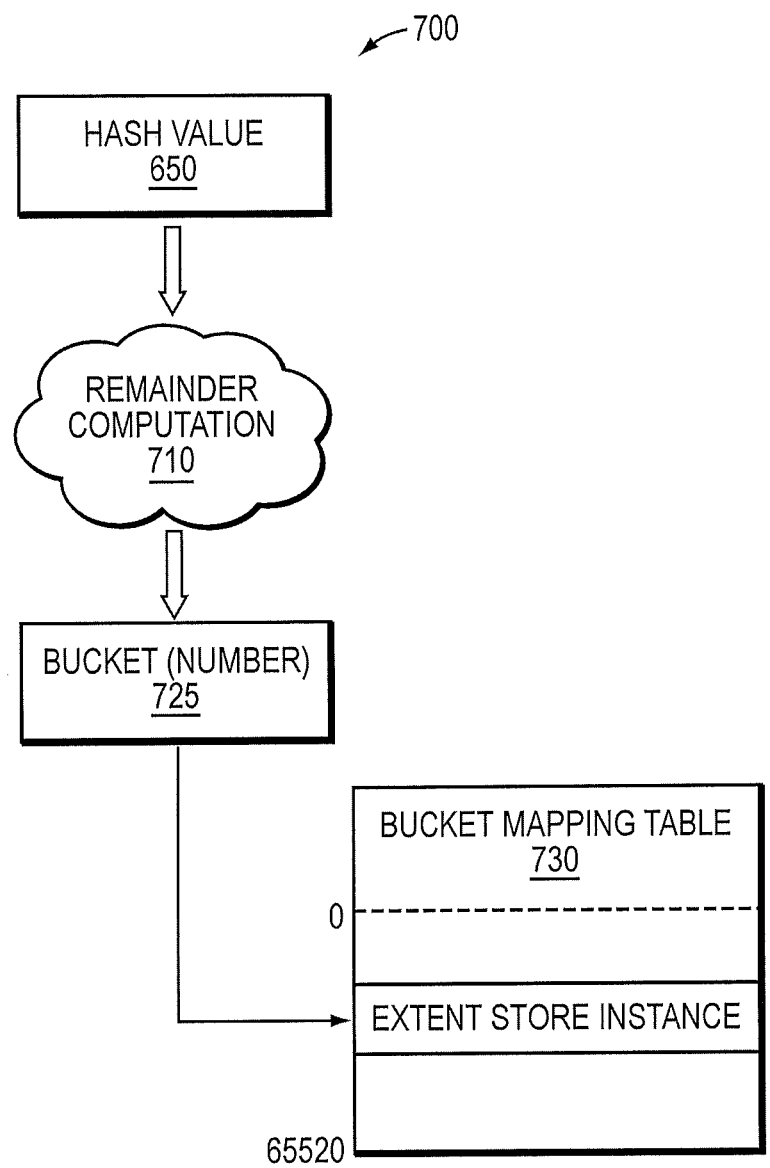
FIG. 7 is a block diagram of a bucket mapping technique.

FIG. 7 is a block diagram of the bucket mapping technique 700 that may be advantageously used with one or more embodiments described herein. As noted, the hash value 650 may be computed at the persistence layer 330 so as to enable efficient distribution of the extents 610 and associated extent metadata evenly throughout the nodes 200 of the cluster. In an embodiment, the mapping technique divides (e.g., substantially evenly) the hash space of the 48-bit hash value 650 (i.e., $2^{48}$) into buckets that, collectively, are representative of the extents and associated extent metadata. A substantially equal number of buckets is then assigned or mapped to each extent store instance of the nodes in the cluster 100 to thereby distribute ownership of the buckets, and thus the extents and extent metadata, substantially evenly, i.e., approximately uniformly, across all the extent store instances 720 of the nodes 200. Notably, the buckets may be alternatively assigned (or reassigned) by weighted distribution according to characteristics of the nodes such as storage capacity and performance.

In an embodiment, the bucket mapping technique maps buckets to extent store instances using a remainder computation 710 based on modulus arithmetic: the hash value divided by (modulo) the number of buckets, e.g., [hash value] mod [number of buckets]. Illustratively, the number of buckets (i.e., divisors) is a prime, e.g., 65521 (the largest prime less than $2^{16}$), although those skilled in the art will recognize that other divisors may be used in accordance with the embodiments described herein. The results of the remainder computation may be organized as a data structure, such as a bucket mapping table 730, having 65521 bucket number entries, each of which maps to (references) an extent store instance. Alternatively, a bucket mapping data structure in the cluster database 244 may be used to associate a bucket (number) 725, e.g. 0-65520, to an extent store instance or node 200 to thereby map the corresponding bucket to that extent store instance or node.

The buckets may be continually mapped to extent store instances and, as new extents 610 are formed, they may be assigned to the buckets. The mappings from bucket numbers to extent store instances of the nodes are essentially arbitrary; a requirement may be that the number of buckets served by each extent store instance is proportional to the storage capacity and processing bandwidth available in each node 200. The buckets 725 may be distributed among the extent store instances to thereby achieve a substantially even and balanced level of capacity and bandwidth utilization across all of the nodes in the cluster 100.

A new extent 610 may be subsequently formed at a node and applied to the hash function 620 to generate a result (as described above), which may be trimmed using technique 640 to generate the hash value 650 to select the extent store instance for storing the new extent 610. The hash value 650 may then be processed by the remainder computation 710 that divides the hash value by the number of buckets, e.g., [hash value] mod [number of buckets], wherein the number of buckets is illustratively a prime, e.g., 65521. The result of the computation generates a bucket number associated with a bucket that functions as an index into a selected entry of the bucket mapping table 730 to identify an extent store instance that serves the new extent associated with the hash value 650. Alternatively, the bucket mapping data structure of the cluster database 244 may be searched using the bucket number as a key to identify an associated value, i.e., an extent store instance or node 200, of a key-value pair. The hash value 650 may thereafter be passed to the extent store instance to enable selection of extent metadata used to identify a location 530 of the extent on SSD 260.

Cuckoo Hashing

In an embodiment, storage and retrieval of key-value pairs employ cuckoo hashing, i.e., the set of cuckoo hash tables, using a portion of the hash value 650 as a hash table index (i.e., indexing into the cuckoo hash table), which is illustratively split in half. Each half of the hash table index may be used as an index into each cuckoo hash table to determine a potential entry for storing the other half of the hash table index in the table. That is, one half of the hash table index may be used as the index into the cuckoo hash table, while the other half may be used as the value stored in the hash table. Alternatively, the other half of the hash table index may be used as the index, while the one half may be used as the stored value. Thus, the same hash table index can be stored in the cuckoo hash table in two different ways, i.e., either in an upper half or lower half of the cuckoo hash table. This allows higher population, i.e., load factor, in the hash table without chaining, e.g., the use of linked lists, by accessing an entry with the one half of the hash table index as the index and, if the entry is occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry that is indexed by half of the hash table index, there is a plurality of possible slots (i.e., a group of slots associated with the index) into which the other half of the hash table index may be inserted/stored, i.e., all of the slots are associated with the indexing hash table index (i.e., the hash table index used to index the group of slots), but each slot may include a different other half of the hash table index. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used. Note that a number of searches for a free slot may be limited (e.g., maximum of three entries evicted) before a hash table is deemed too full to store the key.

In an embodiment, the cuckoo hash table may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be unoccupied slots for any particular hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 820 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Hash Table Organization

Figure 8A:
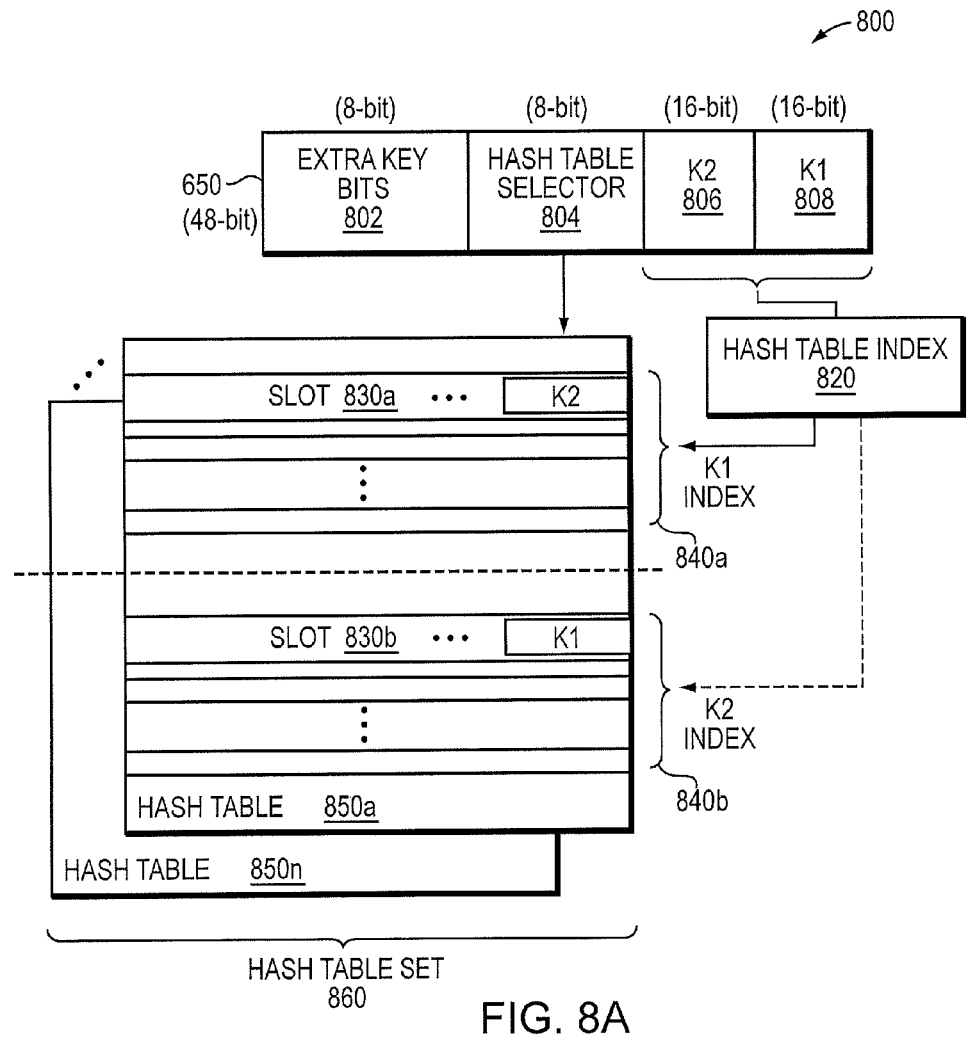
FIG. 8a is a block diagram of a hash table entry selection technique.

FIG. 8a is a block diagram of a cuckoo hash table that may be advantageously used with one or more embodiments described herein. In an embodiment, the extent metadata resides entirely in the memory 220 of each node 200 and is embodied as a hash table 850*a-n* of a set of hash tables 860 configured to address locations of the SSD. Note that the bucket mapping technique 700 ensures that the buckets assigned to the extent store instances are substantially evenly populated with extent metadata such that each bucket contributes equally to the hash tables served by an extent store instance, i.e., the bucket mapping technique 700 has an approximately uniform distribution. The extent store instance may use the hash value 650 to provide the extent metadata selection technique 800. To that end, the contents of the 48-bit (6 byte) hash value, i.e., the hash value 650, are illustratively organized into the following fields (in no particular order): an 8-bit field used as an index to select a hash table, i.e., one of 256 tables, from the set of hash tables ("hash table selector" 804), an 8-bit field used for, inter alia, bucket selection and hash table selection ("extra key bits" 802), and two 16-bit fields used as indices to entries 840*a-b* (i.e., group of slots) in the selected hash table ("K2" 806 and "K1" 808). Each hash table 850 includes two halves where each half is addressable by one of the 16-bit indices (e.g., "K1" and "K2"), so that each table half may include 65536 (i.e., $2^{16}$) entries 840. Note, the hash table index 820 is determined from K1 and K2 depending on which half of the hash table is indexed. Further, each entry 840*a-b* is a 32-way associative set of slots 830 having the key-value pair. Accordingly, there are $2^{16} \times 32 \times 2$ (i.e., entries×associativity×2 table halves)=4 M (4,194,240) total slots ("slots") per hash table and at least 256 tables, i.e., hash table selector 804, per extent store instance, yielding a billion (1,073,725,440 exactly) slots for the extent store instance. Notably, the hash table set may be further expanded into subsets selected based on a function applied to the hash value 650 (e.g., computing a remainder of the hash value 650 for a prime number as an index to a subset of the hash table set 860), an exemplary embodiment of which is described in commonly owned U.S. Pat. No. 8,996,535 titled Extent Hash Structure for Storage System to Kimmel et el. issued Mar. 31, 2015 that expands the number of hash tables to 768 (3×256), yielding three billion (3,221,176,320 exactly) slots.

Figure 8B:
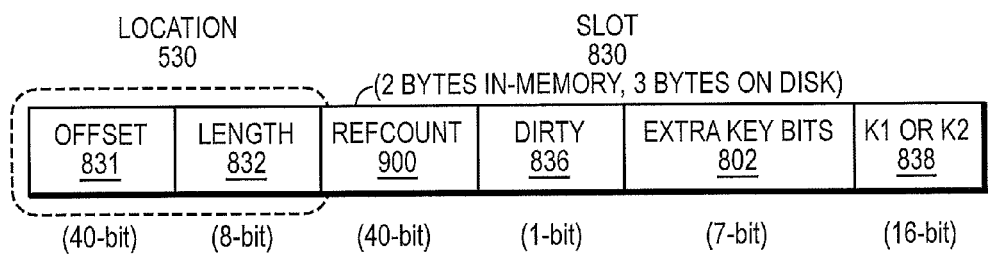
FIG. 8b is a block diagram of a hash table slot.

FIG. 8b is a block diagram of a hash table slot 830 that may be advantageously used with one or more embodiments described herein. In an embodiment, the slot may be organized as a 10-byte (80-bit) value having the following fields: a 5-byte (i.e., 40-bit) offset 831 indicating a location on SSD for an extent "keyed" by the slot; a 1-byte (8-bit) length 832 indicating a size of the extent; a reference count encoding a count having at least 32-bits ("refcount" 900) using 16-bits (2 bytes) of the slot in-core and another 3 bytes stored on disk that indicate a number of metadata references to the extent; a dirty bit 836 indicating whether the slot has been changed, i.e., is "dirty"; the extra key bits 802 from the hash value 650 for the extent; and either "K1" 808 or "K2" 806 not used as the hash table index 820 to index to the entry 840. Thus each slot may encode at least 14 bytes of information using 10 bytes in-core and 3 bytes on disk. Note that the length field 832 may represent a number of sectors of a given size based on the geometry of the SSD 260, e.g., 512 bytes or 520 bytes, such that a 1-byte length may represent a range of 255×512 bytes=128K bytes. Accordingly, an extent may vary from 512 bytes to 128K bytes in 512 byte increments.

In an embodiment, combinations of sentinel values in one or more fields of the slot 830 may be used to indicate a type of extent, such as i) a "hole" or deleted extent and ii) a "put" or stored extent. For example, a refcount 900 of zero and offset 831 of zero may be used to indicate a deleted extent, whereas a refcount 900 greater than zero (i.e., one) and offset 831 other than zero may be used to indicate a stored extent. Compactness of the slot fields benefits efficient use of memory as it is desirable to maintain the hash tables in-core for fast lookup of key-value pairs, i.e., locations of extents from hash keys. For example, the previously calculated 1 billion slots may consume approximately 10 GB in-core, i.e., 10-bytes per slot, not including any expansion (e.g., the expansion technique in an exemplary embodiment in aforementioned U.S. patent Extent Hash Structure for Storage System multiplies the in-core consumption by 3). Notably, each extent store instance may support a LUN capacity of at least 4 terabytes (TB) based on a minimum 4 KB extent size (1 B×4 KB per extent) to a maximum of 384 TB based on a 128 KB extent size with hash table expansion (1 B×3 expansion×128 KB per extent).

In an embodiment, there are illustratively 768 hash tables in the hash table set 860, wherein each hash table 850 has a same size, e.g., approximately 4 million entries. Illustratively, the number of hash tables may be determined by multiplying the 8 bits of the hash table selector ($2^8$ or 256) by a prime (3) such that 256×3=768. Note that if more than 768 tables are needed, then the multiplier to 256 may be a prime that is larger than 3, e.g., 5×256 equaling 1280 tables. The randomness, i.e., approximately uniform distribution, of the 48-bit hash value 650 may be relied upon to spread the metadata evenly among the hash tables 850.

The hash table selector 804 may thereafter be used to select an appropriate in-core hash table 850 having an extent key 810 that is used to map to a SSD location to determine whether the extent 610 is presently served by the selected extent store instance. Illustratively, the appropriate hash table 850 is selected by dividing (modulo) the entire 48-bit hash value 650 by a prime divisor, e.g., 3, to generate a remainder (between 0-2) and multiplying the 8-bit value of the hash table selector by 3 to generate a value that is then added to the remainder, i.e., 3×[hash table selector 804]+[hash value 650] mod 3. It should be noted that, in general, the 48-bit hash value 650 may be overloaded with prime divisors to obtain various hash table indices to address varying amounts of hash tables 850. The 768 hash tables represent a number of tables that can reasonably fit in memory 220.

Once a hash table 850a is selected, the extent store instance may extract either K1 or K2 of the hash value 650 for use as the hash table index 820 to index into the hash table (e.g., using K1 for the upper half of the table and K2 for the lower half of the table) and select an appropriate entry 840a configured to store, inter alia, a portion of the extent key 810, as well as an identification of location on SSD. Notably, K1 and K2 are distinguished from each other using an implied high-order bit that splits the cuckoo hash table into an upper address space and a lower address space. Illustratively, the implied high-order bit increases the address capability of K1 or K2 from $2^{16}$ possible locations to $2^{17}$ possible locations, where the upper address space of the hash table is addressable by one 16-bit field (e.g., K1) of the hash value and a lower address space of the hash table is addressable by the other 16-bit field (e.g., K2). In an embodiment, the selection of which hash table index (K1 or K2) to use to initially index into cuckoo hash table is arbitrary. Illustratively, a lower-order bit of the hash value (e.g., mod 2) may be used to select which hash table index to use. In the case of an insertion of an entry (e.g., storing an extent) into the cuckoo hash table 850a, a desired approach may be to choose whichever upper or lower address space set is less occupied (after an exhaustive search of both sets 840a and 840b).

As noted, each cuckoo hash table has set-associative slots, e.g., 32 slots per associative set. In an embodiment, there is no ordering of the 32 slots within the associative set of an entry; a linear search may be performed to find an empty slot for inserting an extent key. Alternatively, the slots may be ordered to accommodate a faster search, e.g., binary search, especially for larger associative sets (e.g., 128 way), which may not fit into a CPU cache line. Similarly, once the associative set of slots is identified, i.e., as entry 840, that could hold the extent key, the linear search may be performed within the slots to determine whether the key is present. The advantage of the cuckoo hash table is that there are exactly 2 entries (each having 32 slots) in the entire cluster 100 at which a given extent key value can reside. Once the entry is indexed using K1 or K2 along with the implied high-order bit, there are 32 slots within the entry 840 to search.

In an embodiment, the number of slots per entry 840 is illustratively chosen as 32, because all 32 slots can fit into a cache line of, for example, an Intel processor (i.e., 32×size of the hash table index 820 in the slot). In other words, 16 bits or 2 bytes (K1 or K2) times the 32 slots equals 64 bytes, which is the size of an illustrative cache line. Once an operation fetches and manipulates a cache line, the cache line remains cached until it is evicted. For a linear search of the cached slots 830, no further fetch from memory may be required, thus avoiding any eviction of previously cached slots for the entry 840. Illustratively, the size of the set (i.e., 32 slots) is arbitrary and chosen so as to fit in the cache line. Without changing any of the algorithms for accessing a given set, i.e., entry 840, the set size could be changed to an arbitrary integer and even vary per set. The information constituting the remaining 8 bytes of an entry (including the offset 831 which constitutes part of the extent location 530 on SSD) may be stored out-of-line, i.e., not cached during the search of slots, in another portion of the hash table 850. It should be noted that the hash table 850 may be stored in column major order in memory (e.g., defining the hash table in the "C" programming language as a structure including the fields of the slot 830 as separate arrays). Thus, if it is desirable to access the K1 or K2 16-bit field, only one cache line access may be required.

To ensure fast and efficient performance, the hash table 850 may be further organized to require only one disk (SSD) access for every extent obtained from the extent store instance. This is possible because the extent store layer 350 of the storage I/O stack 300 does not have the overhead of a directory hierarchy organization and, therefore, when an I/O request is forwarded to the extent store instance, a fast lookup in memory 220 may occur to the appropriate in-core hash table 850 and then the SSD(s) are accessed just once. Thus, there may be only one SSD access per I/O (read or write) operation, thereby improving read and/or write amplification.

As previously noted, each slot (i.e., entry of the hash table) may have 14 bytes of information, wherein the refcount 900 occupies 5 bytes of that information (2 bytes in-core, 3 bytes on-disk) and supports a large amount of virtual, oversubscribed storage of, e.g., 150 terabytes with an average extent size of 512 bytes, worse case. In addition, the 768 hash tables, once paged into memory, constantly reside in memory. Each hash table has approximately 4 million hash table entries; thus 768×4 M×14 bytes=45 gigabytes (GB) of memory may be consumed by the hash tables. The technique described herein is directed to reducing the memory footprint (i.e., the amount of memory) consumed by the hash tables by encoding the 14 bytes of information per slot into 11 bytes in-core and 3 bytes on disk.

Reduction of In-Memory Reference Count

Figure 9:
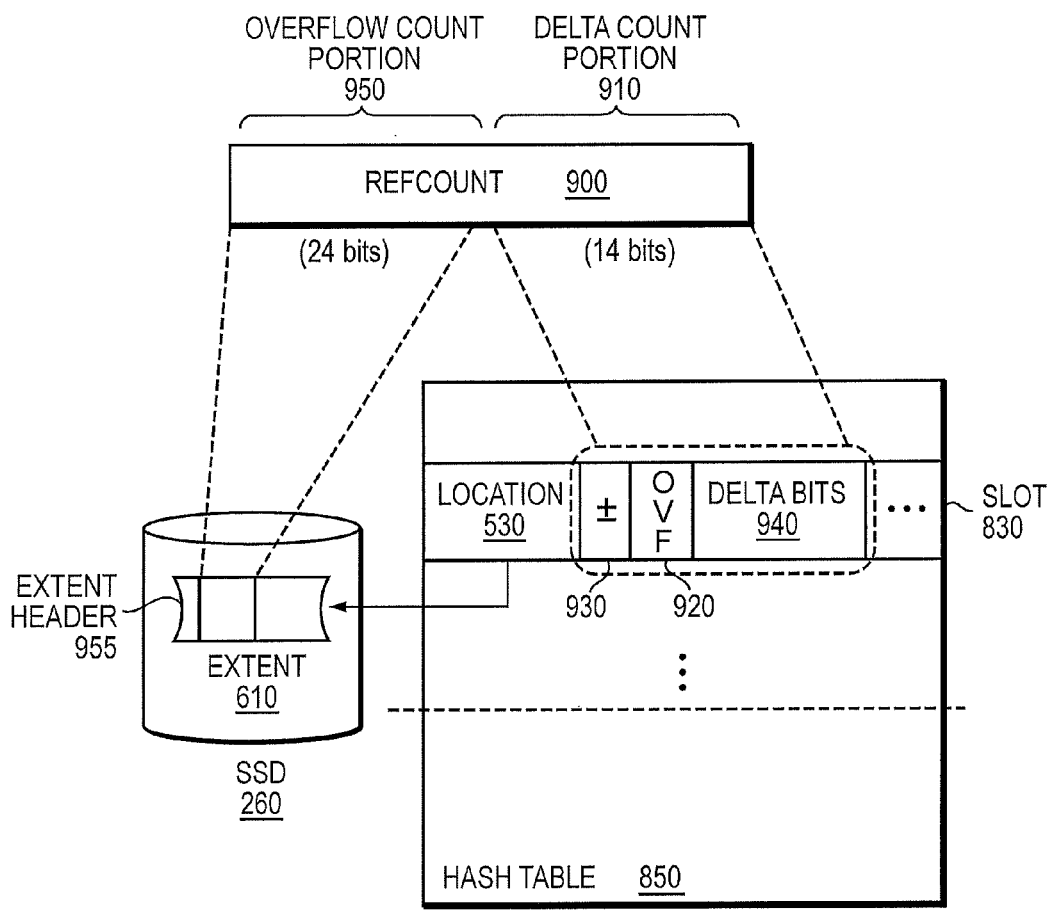
FIG. 9 is a block diagram of a technique for reducing metadata, such as a reference count, stored in a memory of the node.

FIG. 9 is a block diagram of a technique for reducing metadata, such as the reference count, stored in a memory of a node. According to the technique, the refcount 900 has a predetermined length (e.g., 5-bytes) that is illustratively divided into two predetermined portions: a 2-byte (16-bit) delta count portion 910 stored in memory 220 for each slot 830 of the hash table 850 and a 3-byte (24-bit) overflow count portion 950 stored on disk (e.g., SSD 260) in a header of each extent 610 (i.e., the extent header 955). By reducing the in-memory reference count field from 5 bytes to 2 bytes, 3 bytes of memory are saved for each slot 830 (i.e., yielding 11-byte slots) of the hash tables 850 (assuming 768 hash tables), which translates to 9.6 GB (3 B slots×3 bytes=9,663,528,960 bytes exactly) of memory reduction (memory space savings) across the 768 hash tables 850 of the extent store instance. In other words, the memory footprint of the hash tables is reduced from ~45 GB to ~35 GB, which translates to approximately a 21% saving. Note, in another embodiment, the reference count field is 7 bytes, 5 bytes of which resides on disk, resulting in 16-byte slots reduced to 11-bytes that yield a reduction in hash table memory from ~51 GB to ~35 GB, approximately a 31% saving. This reduction in memory footprint is significant because the amount of memory consumed by the hash tables is directly proportional to the storage capacity supported by the node 200 of the cluster 100. For example, assume the ~45 GB memory footprint implementation of the hash tables supports approximately a 12 terabyte (TB) storage capacity of the extent store for a 4 KB extent size and a hash table expansion factor of 3 (i.e., 768 hash tables). If the storage capacity increases to 24 TB, the hash table memory capacity increases proportionately to ~90 GBs. Therefore, the memory space savings provided by the embodiments herein are substantial to enable more efficient scaling of the storage capacity of the node, as well as the hash table memory capacity (i.e., allowing additional information to be stored in each slot). Accordingly, the technique described herein obviates use of a general paging mechanism wherein all hash tables are not stored in memory and are instead paged to and from disk, which would create performance penalties.

In an embodiment, one bit of the 2-byte (16-bit) delta count portion 910 is reserved as an overflow bit 920 that indicates whether the in-memory reference count has overflowed (or not). The delta bits 940 of the delta count portion 910 may store the "delta" of the reference count. In response to each deduplication of an extent, the delta bits of the reference count may increment to a maximum value of, e.g., 15-bits (e.g., 32,767). Upon reaching the maximum value, the next deduplication operation may increment the overflow count portion 950 (on disk) from, e.g., 0 to 1, the delta bits 940 of the in-memory delta count portion 910 may be cleared (e.g., rollover to 0) and the overflow bit 920 may be asserted (e.g., set to 1). Incrementing the overflow count portion 950 to a value of 1 indicates that the reference count has exceeded the maximum value (e.g., 32,767) once. Notably, the overflow count portion 950 on disk (SSD 260) indicates a number of times that the in-memory delta count portion 910 of the reference count has overflowed. Thus, when the delta count portion 910 fully increments a next time (e.g., to 65,535), the overflow count portion 950 on-disk increments from, e.g., 1 to 2, and the delta bits 940 of the delta count portion 910 are again cleared, e.g., rollover to 0. In essence, the in-memory delta count portion 910 embodies the lower bits of the reference count and the on-disk overflow count portion 950 embodies the upper bits of the reference count.

Note, however, that each time an overflow update occurs (e.g., an overflow or underflow of the in-memory delta count), the on-disk overflow count portion 950 is updated, resulting in a performance penalty (via a disk access) as well as write amplification. For example, incrementing the delta count from 32,767 to 32,768 results in an overflow count portion update as an increment, while decrementing the delta count from 32,768 to 32,767 also results in an overflow count portion update as a decrement. As such, increments and decrements of the reference count may oscillate around an "overflow boundary" (e.g., the maximum value of the delta count), which results in constant disk access (i.e., performance penalty) to update the overflow count portion 950 of the reference count. To avoid this hysteresis effect at the overflow boundary, in an embodiment, another bit of the delta count portion 910 is reserved as a sign bit 930 that indicates whether the value of the delta bits 940 of the delta count portion is positive or negative. Accordingly, the in-memory delta count portion 910 is encoded as a signed magnitude integer representation having 2 bits reserved with the remaining bits (delta bits 940) as the magnitude (e.g., 14 bits having a maximum value of 16,383).

As noted, the hysteresis effect may be triggered when incrementing the delta count (without the reserved bits) from 32,767 to 32,768 that results in (i) updating of the overflow count portion 950 on-disk, (ii) setting (i.e., asserting) the overflow bit 920, and (iii) clearing the delta bits 940. A similar effect occurs when decrementing the delta count from 32,768 to 32,767 that results in another overflow update, which unsets (i.e., clears) the overflow bit 920 and sets the delta bits (e.g., to a value of 32,767). Illustratively, the sign bit 930 addresses the hysteresis effect by, e.g., setting the bit 930 to "0" when the delta bits 940 are positive and setting the bit 930 to "1" when those bits 940 are negative. Thus, the overflow count is updated when the delta count has changed an amount of the maximum value of the delta bits and not merely when the delta count is near the maximum value as in the hysteresis effect. For example, when incrementing the reference count from 16,383 to 16,384 (i.e., delta count is initially at 16,383 and the overflow count is 0), the overflow bit 920 is set (i.e., asserted) to, e.g., 1 (i.e., indicating the maximum value is reached once), the overflow count may remain at 0 (zero), the sign bit 930 is set to 0 indicating that the delta bits 940 are positive, and the delta bits are reset (i.e., rollover) to 0. Subsequently when incrementing the delta count again from 16,383 to 16,384 with the overflow bit set (i.e., reference count increments from 32,767 to 32,768) an update (e.g., increment) occurs to the overflow count portion 950 from 0 to 1 indicating a (total) reference count value of 32,768 (e.g., a first time the overflow count increments). Notably, the overflow bit 920 remains set (indicating an overflow has occurred) and delta bits 940 rollover (set to 0). As a result, a first overflow count (i.e., value of 1) indicates a reference count of 32,768, but subsequent overflow counts indicate an additional 16,384 to the reference count. That is, the first overflow count indicates a value twice the maximum of the delta bits and subsequent counts indicate a number (i.e., quanta) of that maximum value. For example, when incrementing a reference count of 49,150 (e.g., 32,767+16,383), the overflow count 950 is updated to 2 on disk, the delta bits 940 rollover (clear) to 0, the overflow bit 920 remains set at 1 and the sign bit 930 remains set at 0. Advantageously, using the overflow bit in conjunction with the delta bits (e.g., effectively as 15 bits) permits an initial reference count twice the maximum value of the delta bits before a disk access is necessary (e.g., incrementing the overflow counter) thus further reducing write amplification.

Similarly, when decrementing the reference count to the extent 610 (e.g., in response to a delete operation), e.g., from 16,384 to 16,383, the overflow bit 920 is set to 1 (i.e., the max value for the delta bits has been reached), the sign bit 930 is set to 0 and the delta bits 940 of the delta count portion 910 equal a value of 1. Note, however, that there is no overflow update; rather the delta bits 940 decrement from 1 to 0, the overflow bit 920 is still set at 1 and the sign bit 930 is still set to 0 (indicating positive delta bits when the delta bits portion equals 0). Assume then that another reference to the extent 610 is deleted, resulting in a reference count decrement from 16,383 to 16,382. Illustratively, the overflow bit 920 remains set at 1, the sign bit 930 is now set to 1 (indicating that the delta bits are negative) and the delta bits 940 are set to 1 (i.e., indicating a signed delta count of −1) which together represent a reference count value of 16,382. In response to a next delete operation, the reference count decrements from 16,382 to 16,381, the sign bit 930 remains set to 1 and the delta bits increment to 2. Subsequent delete operations result in successive decrements until all the delta bits 940 are consumed (i.e., 16,383 deletes/decrements causing the delta bits to rollover), at which time an overflow update occurs to decrement the overflow count portion 950 from 1 to 0. Therefore, overflow updates may be postponed until the entirety (e.g., 14 bits) of the delta bits 940 are consumed as negative/positive transitions, thereby reducing write amplification. Essentially, the value of the delta bits 940 becomes a signed integer that is added to the reference count (overflow) stored on disk in the header of the extent 620. That is, for the 14-bit delta bits embodiment of the delta count portion 910, a value of −16,383 (or positive 16,383) is needed to perform an overflow update. Accordingly, in an embodiment, the reference count may be computed as equal to the delta bits (without including the overflow bit) when the overflow bit is unasserted (e.g., 0), and computed as equal to the sum of the signed delta bits (including the overflow bit as a high order bit), the maximum value of the delta bits for the first overflow count (e.g., 32,767 including the overflow bit), and the maximum value (i.e., maximum value of the delta bits) multiplied by the overflow count minus one, as described by the following formula:

signed delta bits(with overflow bit)+max_value_delta_bits×(overflow count−1)+max_first_time_delta Note that while embodiments have been shown and described herein with relation to avoiding the hysteresis effect, the contemplated embodiments in their broader sense are not so limited, and may, in fact, allow for use of the mechanisms and technique to, e.g., compute the reference count using other arithmetic techniques such as two's complement.

Capacity Statistics Computation

Capacity statistics are illustratively computed at the extent store layer 350, wherein the statistics include deduplication savings for the extent store (i.e., extent store instance) as a whole, which involves determining the number of deduplicated extents. For example, computing a total deduplication savings (e.g., a total number of de-duplicated bytes) may include accumulating the reference counts from all the slots in each hash table of the extent store to arrive at the capacity statistics (e.g., deduplication savings). Yet to compute the actual reference count (and to calculate deduplication bytes) for an extent 610 having a reference count greater than the maximum in-memory delta count portion 910, the content of the on-disk overflow count portion 950 may be retrieved by, e.g., reading the extent header (of the extent) to acquire the overflow count and then adding the overflow count to the in-memory delta count. However, this approach may be inefficient because of the number of hash tables (e.g., 768) and the substantial number of extents per hash table (e.g., 4 millions) that need to be accounted for in order to compute the total number of deduplication bytes.

As previously noted, fuzzy checkpointing may be employed to persist the hash tables 850 on disk (SSD 260), while NVRAM logging may be used to recover from an unclean shutdown (crash recovery). Exemplary embodiments of such fuzzy checkpointing and NVRAM logging are described in commonly owned U.S. Pat. No. 8,880,787 titled Extent Metadata Update Logging and Checkpointing to Kimmel et al. issued Nov. 4, 2014. The fuzzy checkpointing and logging mechanisms may also be employed to store capacity statistics on a per hash table basis so as to reduce read amplification. As such, the total de-duplicated bytes due to overflow may be computed by reading checkpointed header information per hash table accumulating overflow counts in bytes (i.e., an accumulated size of overflow) from all slots in the hash table.

Figure 10:
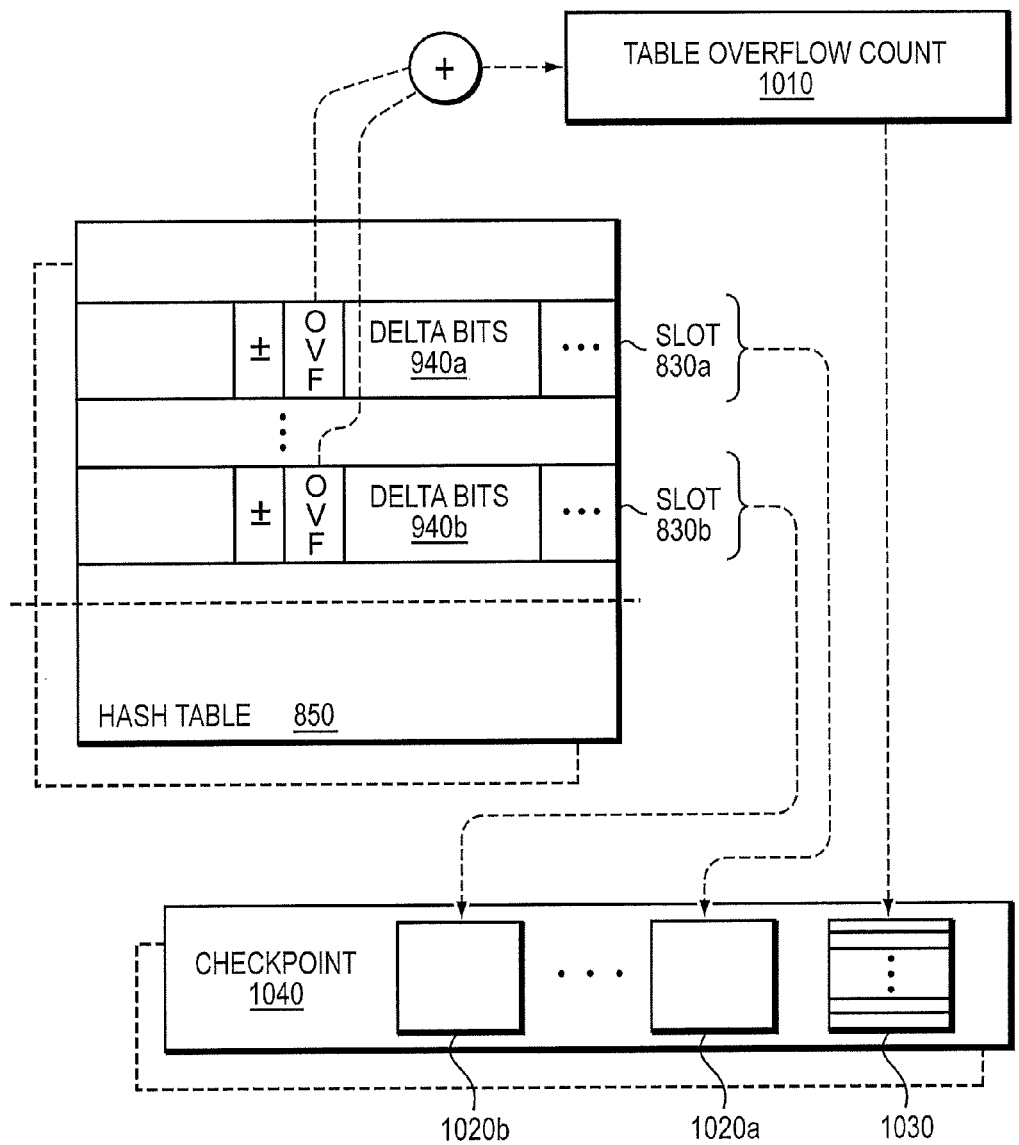
FIG. 10 is a block diagram illustrating computation of capacity statistics.

FIG. 10 is a block diagram illustrating computation of capacity statistics. Illustratively, in response to a mount after a clean (or dirty) shutdown, the hash table pages 850 are read to obtain a table overflow count 1010 from the header 1030 in checkpoint 1040 (or log) and the delta count portions stored in the hash table slots 830*a,b* for each hash table, which may also be read from pages 1020*a,b* of the checkpoint. The table overflow count and the delta count portions may then be used to compute the capacity (e.g., de-duplication savings) statistics. Note that extents may vary in size (e.g., 4 KB, 8 KB, and 16 KB) and be compressed; thus, each slot may be associated with an extent of a different size. In an embodiment, the overflow count portion of each slot for a hash table may be accumulated in bytes, i.e., table overflow count (bytes) 1010, using the length (i.e., size) 832 in the location field 530 for the respective slot. Similarly, an accumulation in bytes for the delta bits portion for each slot of the hash table may also be computed using the length 832 in the location field 530 for the respective slot. Accordingly, the capacity statistics (i.e., de-duplication savings) may be computed by summing of the accumulation of the overflow counts in bytes (i.e., table overflow count bytes) and the accumulation of the delta bits in bytes.

While there have been shown and described illustrative embodiments directed to a technique for reducing an amount of metadata stored in a memory of a node in a cluster, it is to be understood that various other adaptations and modifications may be made within the spirit and scope of the embodiments herein. For example, embodiments have been shown and described herein with relation to computing capacity statistics, such as deduplication savings, at the extent store layer in accordance with the technique and with the use of fuzzy checkpointing and logging mechanisms. However, the embodiments in their broader sense are not so limited, and may, in fact, allow for use of the mechanisms and technique to compute other capacity statistics in the extent store layer such as, e.g., compression savings and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving a first write request having data and receiving a second write request having the data, the write requests processed at a node of a storage system, the node having a processor and a memory, the storage system coupled to a storage device;

applying a hash function to the data of the first write request to generate a first hash table index;

storing a storage device offset in a slot of a hash table indexed by the hash table index, the hash table stored in the memory;

storing the data as an extent on the storage device at the storage device offset, the slot including a first portion of a reference count for the extent;

applying the hash function to the data of the second write request to generate a second hash table index identical to the first hash table index; and updating the first portion of the reference count in the slot for the extent, the reference count including a second portion stored on the storage device, wherein the second portion of the reference count has a larger size than the first portion of the reference count.

2. The method of claim 1, wherein the second portion of the reference count is updated on the storage device.

3. The method of claim 2, wherein an overflow indicator included in the first portion of the reference count is set.

4. The method of claim 2, wherein the second portion of the reference count is updated in response to the first portion of the reference count exceeding a maximum value.

5. The method of claim 3, wherein the first portion of the reference count is a signed integer including the overflow indicator.

6. The method of claim 4, wherein the second portion of the reference count indicates a number of times less one that the first portion of the reference count exceeds the maximum value.

7. The method of claim 4 further comprising:
in response to an unreference request for the extent, decrementing the first portion of the reference count without updating the second portion of the reference count.

8. The method of claim 4, wherein the second portion of the reference count is included in a header of the extent stored in the storage device.

9. The method of claim 1 further comprising:
computing a capacity statistic by accumulating the second portion of the reference count for each slot of the hash table; and
storing the capacity statistic in a header of the hash table on the storage device.

10. A method comprising:
receiving a plurality of write requests having identical data, the write requests processed at a node of a storage system, the node having a processor and a memory, the storage system coupled to a storage device;
applying a hash function to the data of each write request to generate a respective hash table index of a hash table included in the memory;
storing the data as an extent on the storage device;
incrementing a first portion of a reference count for the extent, the first portion of the reference count included in a slot of the hash table indexed by the hash table index; and
in response to the first portion of the reference count exceeding a maximum value, incrementing a second portion of the reference count stored in a header of the extent.

11. A system comprising:
a storage system having a node including a memory connect to a processor via a bus;
a storage array coupled to the storage system and having a solid state drive (SSD);
a storage I/O stack executing on the processor of the storage system, the storage I/O stack configured to:
receive a first write request having data and receiving a second write request having the data;
apply a hash function to the data of the first write request to generate a first hash table index;
store a SSD offset in a slot of a hash table indexed by the hash table index, the hash table stored in the memory;
store the data as an extent on the SSD at the SSD offset, the slot including a first portion of a reference count for the extent;
apply the hash function to the data of the second write request to generate a second hash table index identical to the first hash table index; and
update the first portion of the reference count in the slot for the extent, the reference count including a second portion stored on the SSD, wherein the second portion of the reference count has a larger size than the first portion of the reference count.

12. The system of claim 11, wherein the second portion of the reference count is updated on the SSD.

13. The system of claim 12, wherein an overflow indicator included in the first portion of the reference count is set.

14. The system of claim 12, wherein the second portion of the reference count is updated in response to the first portion of the reference count exceeding a maximum value.

15. The system of claim 13, wherein the first portion of the reference count is a signed integer including the overflow indicator.

16. The system of claim 14, wherein the second portion of the reference count indicates a number of times less one that the first portion of the reference count exceeds the maximum value.

17. The system of claim 14, wherein the storage I/O stack is further configured to:
in response to an unreference request for the extent, decrement the first portion of the reference count without updating the second portion of the reference count.

18. The system of claim 14, wherein the second portion of the reference count is included in a header of the extent stored in the SSD.

19. The system of claim 14, wherein the storage I/O stack is further configured to:
compute a capacity statistic by accumulating the second portion of the reference count for each slot of the hash table; and
store the capacity statistic in a header of the hash table on the SSD.

20. The system of claim 17, wherein the first portion of the reference count is a signed integer, and wherein the overflow indicator remains set in response to the first portion of the reference count decrementing below zero.

* * * * *

UNITED STATES PATENT AND TRADEMARK OFFICE
CERTIFICATE OF CORRECTION

PATENT NO. : 9,934,264 B2
APPLICATION NO. : 14/728482
DATED : April 3, 2018
INVENTOR(S) : Manish Swaminathan et al.

It is certified that error appears in the above-identified patent and that said Letters Patent is hereby corrected as shown below:

In the Claims
Claim 11, Column 23, Line 35 reads:
"connect to a processor via a bus;"
Should read:
--connected to a processor via a bus;--

Signed and Sealed this
Thirteenth Day of October, 2020

Andrei Iancu
*Director of the United States Patent and Trademark Office*